G. W. JACKMAN.
Whiffletree-Hook.

No. 213,201. Patented Mar. 11, 1879.

Witnesses
S. U. Piper
Geo. H. Cooley

Inventor
George W. Jackman.
by attorney.

UNITED STATES PATENT OFFICE.

GEORGE W. JACKMAN, OF BATH, NEW HAMPSHIRE.

IMPROVEMENT IN WHIFFLETREE-HOOKS.

Specification forming part of Letters Patent No. 213,201, dated March 11, 1879; application filed December 9, 1878.

*To all whom it may concern:*

Be it known that I, GEORGE W. JACKMAN, of Bath, of the county of Grafton and State of New Hampshire, have invented a new and useful Improvement in the Trace Attachments of Whiffletrees; and do hereby declare the same to be described in the following specification and represented in the accompanying drawings, of which—

Figure 1:
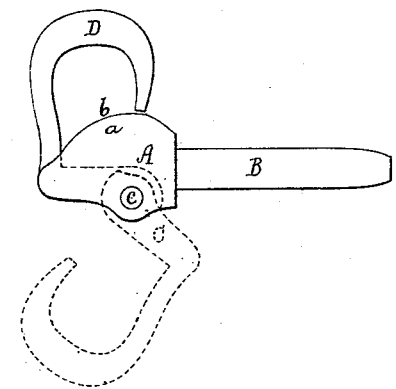
Figure 4:
Figure 2:
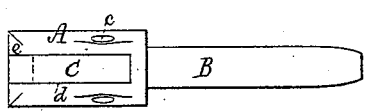
Figure 6:
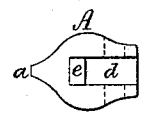
Figure 3:
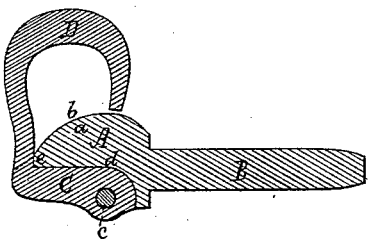
Figure 5:
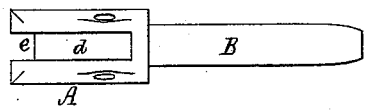

Figure 1 is a top view, Fig. 2 a rear elevation, and Fig. 3 a longitudinal section, of a trace attachment embodying my invention. Fig. 4 is a side view of the arm and its attached hook. Fig 5 is a rear view, and Fig. 6 an end view, of the channeled and notched head for supporting and co-operating with the said arm and hook.

In Fig. 1 the arm and hook are represented by the dotted lines as turned back for either the reception of a trace by or its discharge from the hook.

My present trace attachment, though somewhat analogous to or belonging to the class of that described in the United States Patent No. 201,789, dated March 26, 1878, and granted to me, differs therefrom in material points— that is to say, it has no rounded-end collar nor duplex-shanked hook, like the patented article; but it has a solid head provided with a shank to enter the end of the whiffletree, and such head is recessed or channeled and notched, and is provided with an arcal projection, as hereinafter described. Furthermore, there is pivoted to the head an arm, to which the shank of the hook is fixed, and from which such shank extends at, or about at, a right angle thereto, as represented, the channel or recess in the head being to receive and support the arm, and the notch being to receive and support the shank of the hook.

In the drawings, A denotes the said head, and B its shank. The head is formed, constructed, or provided, as shown, with an arcal projection, $a$, the radius of whose circular arc $b$ has its center in the axis of the pivot-pin $c$, which connects the arm C with the said head. To the said arm the shank of the hook D is fastened, or is in one piece with the arm, and from the arm such shank extends at, or about at, a right angle, as represented.

Furthermore, the head has formed or made in its rear part a channel or recess, $d$, to receive and laterally support the arm. The head also is furcated or notched, as shown at $e$, to receive and laterally support the hook-shank near its rear end.

In turning back the hook from its position shown in full lines in Fig. 1 to that represented therein by dotted lines, the point of the hook will pass into and through the notch $e$, such notch thereby serving to prevent accidental disengagement of the trace from the hook in case of the hook being forced backward by the trace.

In practice, this trace attachment has not only been found to be very efficient, but to operate with little or no rattling or noise.

My invention differs materially from the hook and mode of applying it to a whiffletree as shown in the United States Patent No. 188,912, as I have what are not found in the latter—viz., the arcal projection $a$, the arm C, and recess $d$. The arm C has the hook-shank projecting from it at a right angle, and the head B has the two recesses $d$ and $e$ in it, whereas the hook shown in such patent has no arm C, and consequently no recess for its reception.

I claim as my invention as follows:

1. The combination of the head A, having the arcal projection $a$, with the arm C, pivoted to such head and fixed to and arranged with the hook D, as set forth.

2. The combination of the head A, having the arcal projection $a$ and the arm-receiving recess $d$, with the arm C, pivoted to such head and fixed to and arranged with the hook D, as set forth.

3. The combination of the head A, having the arcal projection $a$ and the hook-shank-receiving notch $e$, with the arm C, pivoted to such head and fixed to and arranged with the hook D, as set forth.

4. The combination of the head A, having the arcal projection $a$, arm-recess $d$, and shank-notch $e$, with the arm C, pivoted to such head and fixed or attached to and arranged with the hook D, as set forth.

GEORGE W. JACKMAN.

Witnesses:
SUSAN R. MORRISON,
GEORGE MORRISON.